United States Patent [19]

Molins

[11] Patent Number: 5,683,812
[45] Date of Patent: Nov. 4, 1997

[54] CERAMIFIABLE SIZING COMPOSITION FOR CONTINUOUS INORGANIC YARNS, YARNS COATED WITH THIS COMPOSITION AND PROCESS FOR SIZING AND HEAT TREATMENT MAKING USE OF THIS COMPOSITION

[75] Inventor: Laurent Jean André Molins, Nemours, France

[73] Assignee: Quartz & Silice, Saint Pierre Les Nemours, France

[21] Appl. No.: 423,845

[22] Filed: Apr. 18, 1995

[30] Foreign Application Priority Data

Feb. 16, 1995 [FR] France .................. 95 01777

[51] Int. Cl.$^6$ .................................................. D02G 3/00
[52] U.S. Cl. .................. 428/375; 428/367; 428/368; 428/364; 428/386; 428/389; 428/391; 428/392
[58] Field of Search ........................... 428/367, 364, 428/375, 386, 389, 391, 392; 106/635, 287.17, 287.14, 436, 437

[56] References Cited

U.S. PATENT DOCUMENTS

| | | | |
|---|---|---|---|
| 3,232,782 | 2/1966 | Shannon | 117/254 |
| 3,372,051 | 3/1968 | Stalego | 428/392 |
| 3,451,886 | 6/1969 | Eakins | 161/93 |
| 3,582,395 | 6/1971 | Adams et al. | 117/124 |
| 3,725,117 | 4/1973 | Caruso | 428/392 |
| 3,968,068 | 7/1976 | Haggerty | 428/392 |
| 4,027,071 | 5/1977 | Motsinger et al. | 428/392 |
| 4,046,948 | 9/1977 | Zlochower | 428/392 |
| 4,158,714 | 6/1979 | Brichta et al. | 428/392 |
| 4,188,421 | 2/1980 | Matsuura et al. | 428/392 |
| 4,221,602 | 9/1988 | Walser | 428/378 |
| 4,233,046 | 11/1980 | Walser | 428/378 |
| 4,233,809 | 11/1980 | Graham | 57/258 |
| 4,259,190 | 3/1981 | Fahey | 252/8.6 |
| 4,296,173 | 10/1981 | Fahey | 428/378 |
| 4,312,911 | 1/1982 | Smith et al. | 428/392 |
| 4,317,859 | 3/1982 | Smith | 428/392 |
| 4,379,111 | 4/1983 | Smith et al. | 428/392 |

FOREIGN PATENT DOCUMENTS

| | | |
|---|---|---|
| 1140004 | 1/1983 | Canada . |
| 0019469 | 11/1980 | European Pat. Off. . |
| 0294830 | 12/1988 | European Pat. Off. . |
| 2335553 | 7/1977 | France . |
| 1421912 | 3/1969 | Germany . |
| 1494898 | 9/1971 | Germany . |
| 4117041 | 11/1992 | Germany . |
| 1041996 | 9/1966 | United Kingdom . |

OTHER PUBLICATIONS

Nogami et al., "Solutions for the Formation of Metal Oxide Coatings", Chem. Ab. 119:123496z, No. 12 (Sep. 20, 1993).

*Primary Examiner*—Patrick Ryan
*Assistant Examiner*—J. M. Gray
*Attorney, Agent, or Firm*—Watson Cole Stevens Davis, P.L.L.C.

[57] ABSTRACT

A ceramifiable sizing composition includes, in % by weight:

a) 5.5 to 20% of at least one water-soluble metal salt chosen from chromium, zirconium, titanium and aluminum salts;

b) 0.2 to 15% of at least one binding agent;

c) 0.15 to 3% of at least one silane giving the continuous inorganic yarn good properties of resistance to abrasion and of tensile strength of dry yarn;

d) 0.6 to 17% of at least one lubricating agent; and e) a balance of water.

4 Claims, No Drawings

CERAMIFIABLE SIZING COMPOSITION FOR CONTINUOUS INORGANIC YARNS, YARNS COATED WITH THIS COMPOSITION AND PROCESS FOR SIZING AND HEAT TREATMENT MAKING USE OF THIS COMPOSITION

BACKGROUND OF THE INVENTION

1. Field of the Invention

The invention relates to a ceramifiable sizing composition for continuous yarns made of inorganic substance, to the continuous inorganic yarns coated with this composition, and to a process for sizing and heat treatment making use of this composition.

The expression "continuous inorganic yarns" is here intended to mean all continuous fibrous products such as yarns, fibers and filaments and the like, consisting of a glass, of silica or of a ceramic material.

Continuous glass yarns include especially those made of E glass (containing more than 52% by weight of $SiO_2$), and of R, RH, S and D glasses (containing more than 60% by weight of $SiO_2$). These yarns can be obtained, for example, by drawing from a glass melt.

Continuous silica yarns include those whose composition contains more than 96% by weight of silica, such as fused silica yarns, washed glass yarns, silica yarns obtained by spinning silicate or by the sol-gel route or silica yarns obtained by drawing a preform.

Continuous ceramic yarns include those whose composition is based on at least one metal oxide, nitride or carbide or a mixture or compound of these, in particular at least one aluminum, silicon, zirconium, titanium, boron or yttrium oxide, nitride or carbide. These yarns can be obtained, for example, by preparing a gel (by the sol-gel process) or a silicate and spinning through a die.

Continuous inorganic yarns are employed in applications for cable insulation, for fire barriers, for furnace curtains and for insulation of heating elements, inter alia, but have the disadvantage of losing all flexibility because, for example, of too rapid crystallization. Most of the time these products are accordingly employed in static applications at temperatures below 1,000° C.

2. The Prior Art

Various processes have been described for the purpose of attenuating the deterioration in the mechanical and thermal properties of continuous inorganic yarns under the effect of heat. These processes are based on the formation of a protective ceramic coating on the yarns from a finishing composition applied to the yarn.

Thus, U.S. Pat. No. 3,232,782 describes a process which consists in coating the surface of a vitreous body consisting chiefly of silica with a solution of an acid salt of one of the metals Cr, Al, Zr, Ti, Be and Mg, and in converting this salt to oxide or silicate in situ.

To achieve this objective the vitreous body (glass fiber fabric) is first of all leached with an acid (HCl, $H_2SO_4$) and then heated to 871° C. for two hours, immersed rapidly in a solution of said salt (Cr acetate and sulfate are mentioned in the examples), immersed in another solution (silicic acid, ammonium hydroxide) and dried. A gelatinous layer of hydroxide or silicate is formed at the surface of the fibers thus treated and a heat treatment allows it to be converted into a protective oxide layer.

GB-A-1,041,996 describes the treatment of silica fibers, and above all of fabrics produced from such fibers, with an aqueous solution of an organic chromium salt (such as Cr acetate or formate). It is stated that such a compound is essential if a good bonding of the coating to the fibers is to be obtained. The operation must generally be repeated a number of times. The product thus treated is then heated to 1093° C. in an oxidizing atmosphere to form a layer of chromium sesquioxide.

U.S. Pat. No. 3,232,782 describes a process according to which a silica-based body (a fabric in the examples) is treated with a solution obtained by reacting oxalic acid and ammonium dichromate. The body thus coated is heat-treated (from 815° to 1093° C. in an oxidizing atmosphere), which causes a uniform layer of $Cr_2O_3$ to form at its surface.

EP-A-0,019,469 describes a process for forming a layer of $Cr_2O_3$ on ceramic fibers (containing, for example, 40–100% of $Al_2O_3$ and 0 to 60% of $SiO_2$ by weight) by placing the fibers in contact with a solution containing 0.1 to 20% by weight of Cr ions and then raising the pH of this solution to 9.5 (by addition or formation of $NH_4OH$), which has the effect of precipitating $Cr_2O_3.xH_2O$. Finally, the remaining water is evaporated off and heating to 200°–1200° C. is applied to convert $Cr_2O_3.xH_2O$ to $Cr_2O_3$.

It is furthermore commonplace to apply a sizing composition to a continuous inorganic yarn as soon as it is formed, firstly to allow filaments to be drawn and secondly to improve its processability, that is to say, its ability to undergo the various textile operations such as weaving, reeling and braiding required for converting it into articles such as braids, fabrics, knits and others.

The size allows the cohesion of the yarn to be ensured and also acts as a lubricant.

The use of a process for forming a protective ceramic coating cannot be applied to a sized yarn as a result of the lack of adhesiveness, and the converted product (such as a fabric, braid, knit or sheet) must be desized before the finishing composition is applied. Furthermore, the application of a finishing composition to complex textile forms (tubular fabric, sock, conical fabric, braid and the like) is very difficult.

It would therefore be very useful to have available a single composition simultaneously acting as a sizing composition and a finishing composition of the kind described above, which could be applied to the continuous yarn before the latter is subjected to textile operations.

Such a composition would make it possible in particular to produce easily composite textile articles coated with a finishing composition of the abovementioned kind.

The present invention is aimed at providing just such a composition.

SUMMARY OF THE INVENTION

More precisely, the invention relates to a ceramifiable sizing composition which includes, in % by weight:

a) 5.5 to 20% of at least one water-soluble metal salt chosen from chromium, zirconium, titanium and aluminum salts;

b) 0.2 to 15% of at least one binding agent;

c) 0.15 to 3% of at least one silane giving the continuous inorganic yarn good properties of resistance to abrasion and of tensile strength of dry yarn;

d) 0.6 to 17% of at least one lubricating agent; and e) a balance of water.

In addition, the composition may optionally contain up to 2% by weight of at least one known conventional additive (f), for example a wax, a plasticizer, an antistatic agent, a surface-active agent, an emulsifier and the like.

Compositions made up of the above ingredients but in proportions lying outside the above-mentioned ranges do not give satisfactory results, either in that only little or no improvement is obtained in the heat resistance properties, or in that the yarns are difficult or impossible to process by means of the usual textile operations.

The composition preferably includes, in % by weight:
10–18% of ingredient (a),
1–6% of ingredient (b),
0.4–1.8% of ingredient (c),
1.5–10% of ingredient (d), this ingredient (d) consisting of soluble oil in a proportion of 0.3 to 4% and of emulsified oil in a proportion of 0.3 to 6%,
0.1–1% of wax, and
0.1–1% of plasticizer, and
a balance of water.

A particularly preferred composition includes, in % by weight, approximately:
15% of ingredient (a),
3% of ingredient (b),
1% of ingredient (c),
2% of soluble oil,
3% of emulsified oil,
0.5% of wax, and
0.5% of plasticizer, and
a balance of water.

DETAILED DESCRIPTION

Ingredient (a) is chosen from water-soluble chromium, zirconium, titanium and aluminum salts, for example the chlorides, nitrates, sulfates and acetates of these metals. Specific preferred examples are $CrCl_3.6H_2O$, $AlCl_3.6H_2O$, zirconium acetate and titanium oxysulfate hydrate.

Ingredient (a) is the basic constituent which will enable a protective ceramic coating to be formed on the yarn. At least 5.5% thereof is needed because, below this minimum, a sufficient heat protection of the yarn is not obtained. Above 20%, the processability of the yarn drops rapidly.

Ingredient (b) is a binder which may be chosen from a large number of known binding substances. This binder must, however, have very little adhesiveness or residual tack and must form a relatively flexible film on the yarn after the water has evaporated. It is possible, for example, to employ polymer binders such as polyesters, epoxy esters, (meth) acrylic polymers, polyurethanes, polyurethanes containing isocyanate functional groups, polyamides or epoxy resins or vinylidene chloride-acrylate copolymers, in particular in the form of emulsions. Specific examples of usable binders are, without any limitation being implied, a polyamide resin based on polyamines and fatty acid with an amine value of 385 mg of KOH/mg of resin, an emulsion of epoxy resin with a number-average molecular weight of 350 and an epoxy equivalent weight of 300 g, an emulsion of polyepoxyester resin with a number-average molecular weight of 7400 and an epoxy equivalent weight of 5600 g, an emulsion of epoxydized polyvinyl acetate copolymer, an acrylic resin emulsion with a viscosity of 100 mPa s and a dispersion of copolymer of vinylidene chloride and of an acrylate. It is also possible to employ binders of natural origin such as starches.

The function of the binder (b) is to ensure the cohesion of the fibers constituting the yarns during the textile conversion operations. At least 0.2% of binder is necessary to obtain an observable effect. Above 15% the processability of the yarn is affected.

Ingredient (c) may be chosen from the various known types of silanes to give good properties of resistance to abrasion and tensile strength of dry yarn to the inorganic yarns to which they are applied. These silanes are usually compounds containing organofunctional groups such as amine, alkoxy, epoxy, sulfide, methacroyl, vinyl, ureido or isocyanate groups. Specific examples of usable silanes are gamma-aminopropyltriethoxysilane, gamma-glycidoxypropyltrimethoxysilane, beta-(3,4-epoxycyclohexyl)ethyltrimethoxysilane, gamma-methacryloxypropyltrimethoxysilane, hexadecyltrimethoxysilane, cyclohexenylethyltrimethoxysilane and N'-benzylbeta-aminoethylpropylammoniumtrimethoxysilanehydrochloride, among many others.

Below 0.15% of silane its effect becomes negligible. Above 3% no additional improvement in the properties is observed.

Ingredient (d) consists of at least one lubricating oil chosen from soluble oils and emulsified oils. Specific examples of such oils are polyalkylene glycols, vaseline oil, silicone oils (such as a dimethylpolysilicone with a viscosity of 350 mPa s at 25° C.), mineral oils with nonylphenol and fatty alcohol ethoxylates, and tertiary amine salts. It is preferred to employ an ingredient (d) consisting of at least one soluble oil and of at least one emulsified oil. At least 0.6% of lubricant (d) is needed to obtain a suitable yarn lubrication. Above 17% there is too much lubricant and the yarn processability suffers thereby.

The optional ingredient(s) (F) are chosen from the various types of additives usually employed in sizing compositions. The most common ones are waxes, plasticizers and antistatic agents. One example of plasticizer is glycerin. Examples of waxes are polyoxyethylene glycols, an epoxidized polyoxyalkylene with a melting point of 40° to 50° C., imidazolines (such as an alkylimidazoline produced by reaction of tetraethylenepentamine and stearic acid which has a gel point of 32° to 38° C). An example of antistatic agent is tridecylphosphoric acid.

It should be noted that many commercially available products are capable of being employed as ingredients of the present composition. Let us cite, for example:

Ingredient (a): hydrated aluminum chloride (Merck-Clevenot Company, Nogent-sur-Marne, France), zirconium acetate (Hoechst Company, Paris la Défense, France), hydrated titanium oxysulfate (Aldrich-Chimie Company, Strasbourg, France).

Ingredient (b): the products AMAIZO®5, (50% high amylose starch refined from a special hybrid corn), AMAIZO®71 (high amylose corn starch) and AMAIZO® 2213 (crosslinked common corn starch) sold by the American Maize Products Company, Hammond, Ind., USA; the products DIOFAN® A 564 S (aqueous dispersion of a crosslinkable copolymer based on vinylidene chloride and an acrylate) and ACRONAL® 250D (acrylate(acrylic ester)) sold by the company BASF France, Levallois-Perret, France; the product FULATEX® 3769B (modified vinyl acetate homopolymer) sold by the company H.B. Fuller, GmbH, Munich, Germany; the product AMIDE 14 (reactive polyamine resin based on dimerized fatty acid and polyamines) sold by the company Rondot S.A., Champagne au Mont d'Or, France; the products NEOXIL 961 (epoxy-ester resin MN-7400: EEW: 5600 g:TG-15° C.) and 965 (epoxy resin MN-350: EEW-300 g) sold by the company D.S.M. Italia, Como, Italy, the product ACRYMUL® AM219 R (cationic acrylic polymer) sold by the company Protex, Levallois-Perret, France.

Ingredient (c): the products A 1100 (gama-aminopropyl triethoxysilane), A 1128(chlorhydrate DE Nbenzyl B amino ethyl propyl amnonium trimethoxy silane hydrochloride), A 174, A 187 (gamma-glycidoxy propyltrimetroxysilane) and A 186 (beta-(3,4-expoxycyclohexyl)ethyltrimethoxysilane) sold by the company OSI Specialties (UK) Ltd., Harefield, Middlesex, Great Britain; the products Ameo® (3 amino-propyl triethoxysilane), DYNASYLAN 9116 (hexadecyl trimethoxysilane) and 6281 (cyclohexenyl ethyltrimethoxysilane) sold by the company Hüls AG, Marl, Germany; and the product Z6032 (styril amine functinal silane) sold by the company Dow Corning France S.A., Lyons, France.

Ingredient (d): the products NS 703 (soluble vaseline-based oil) and NS 704 (vaseline-based soap) sold by the company Condat, Châsse Rhône, France; the products AMMONYX® LO (alkyldimethylamine), NM 1350 (dimethylpolysiloxane) and AMISIL® (silicone emulsion) sold by the company Rondot S.A.; the products Fiber Lubricant 1498 (polyalkylene glycol) and 9649 ( polyalkylene glycol) sold by the company Benjamin R. Vickers and Sons Ltd., Leeds; Great Britain; the product ENSOLINE® 738 A (white oil and emulcifiers) sold by the company CECA, Paris la Défense, France; the product SM 2128 (polysiloxane (emulsion aqueuse de silicone)) sold by the company General Electric, Cergy-Pontoise, France.

Ingredient (f): the wax Novepox TAN 117 (epoxidized polyoxyalkyoene wax) sold by the company Protex; the wax AMIWAX® (polyethylene glycol Mn-285–315) or CATION® X (fatty amide (77%) and isopropyl alcohol (23%)) sold by the company Rondot S.A.; the plasticizers of the glycerine type sold by the company AMI, Saint Mammès, France.

The composition of the invention is obtained by adding the various ingredients of which it is made up to water, with vigorous stirring, following the rules of the art and the suppliers' recommendations. The final composition comprises a solution and a little emulsion. Deionized water is preferably employed as ingredient (e) to minimize the presence of alkali metal compounds, in order to avoid the formation of cristobalite or tridymite crystals at the surface of the yarns after ceramification.

The invention also relates to a process for sizing and heat treatment of continuous inorganic yarns making use of the composition of the invention. This process includes the stages consisting in:

(i) applying a layer of the composition of the invention to a continuous inorganic yarn;

(ii) treating the resulting coated yarn with a basic aqueous solution to convert the metal salt (a) into metal hydroxide; and (iii) heating the coated yarn resulting from stage (ii) to a temperature above 400° C. for a sufficient time to convert the metal hydroxide into metal oxide.

In stage (i) the composition is applied to the yarn by any usual sizing device (for example applicator roller or sprayer). Rates of application of the composition of between 0.05 and 10% relative to the weight of the yarn are suitable. Rates of 0.2 to 5% by weight, in particular of approximately 1.5 by weight are preferred. The yarn to be sized does not need to be stoved beforehand.

The composition is advantageously applied to the yarn as soon as the latter has been manufactured (fiber-forming).

In stage (ii) the yarn obtained is treated with a basic solution, preferably aqueous ammonia, in order to convert the metal salt deposited into metal hydroxide. This treatment may be performed:

either continuously in the form of a second treatment during the fiber-forming of the yarn:

a basic solution with a pH higher than 10 is deposited on the drawing line either by a sizing roller just after the deposition of the composition of the invention or by spraying on the doubling and assembling units after the deposition of this composition. This solution is preferably a solution of aqueous ammonia at a concentration of 20%, of initial pH 13.2;

or by impregnation of bands of yarns leaving the fiber-forming and before the reeling:

the bands are completely immersed in a basic solution with a pH higher than 10. Bands of a yarn weight of 500 to 1,000 g are preferably immersed for 7 min in an aqueous ammonia solution of pH between 11 and 13.5. The bands are then dried for approximately 21 h in order to obtain a moisture content of between 2% and 15%, suitable for reeling operations;

or after weaving of the yarn, a technique which is of little practical interest since it involves an additional operation after weaving:

the fabric produced from the yarn coated with the composition of the invention is passed over a conventional system for impregnating by padding, at a speed of travel of the order of 10 m/min. The impregnating bath consists of a basic solution with a pH higher than 10, preferably a solution of aqueous ammonia at a concentration of 20%, of pH 13.2.

In stage (iii) the metal hydroxide is converted into refractory oxide by heat treatment at a temperature of 400° C. to 1200° C. for a few tenths of second to 2 hours, the shortest periods being appropriate at the highest temperatures and the longest periods applying to the lowest temperatures, or, much more simply, when in use. The fabric is preferably heat-treated at approximately 600° to 900° C. for approximately 0.1 to 60 seconds, for example by being passed through an electric or gas oven.

The following non-limiting examples are given to illustrate the invention.

In the examples all the tests were conducted on doubled 2×22 tex yarns, 14 micrometer base yarn, twist 150S/160Z.

EXAMPLES

The compositions of the Reference Examples O and of Examples 1 to 12, summarized in Table 1 below, were applied to silica yarns. The other compositions were applied to yarns whose nature is shown in Table 1. The compositions were applied at sizing rates which are also shown in Table 1, treated with aqueous ammonia and the resulting yarns were then baked at 800° C. for approximately 30 seconds in an oven. The performance levels of the yarns obtained are also summarized in Table 1. The Reference Examples O, 13, 15 and 17 and Examples 1 to 3 and 5 to 7 are outside the scope of the invention and are given by way of comparison. Examples 4, 8 to 12, 14, 16 and 18 form part of the invention.

The Reference Examples O, 13, 15 and 17 relate to compositions devoid of metal salt and therefore do not provide the yarns with heat protection at high temperature.

The yarns treated with these compositions exhibit good processability but a mediocre heat behavior, above all in the case of the silica and glass yarns.

Comparative Examples 1–3 and 5–7 show that, when it departs from the limits defined for the composition of the invention, the resulting composition is either unsatisfactory from the viewpoint of its heat behavior (case of Example 1, which contains a proportion of metal salt which is insufficient) or unacceptable because of its poor processability (case of Examples 2, 3, 5, 6, 7) due to a proportion of lubricant which is too low (Example 2) or too high (Example 5), a proportion of silane which is too low (Example 3), a proportion of binder which is too high (Example 7) or a proportion of metal salt which is too high (Example 6). "Poor processability" means that very many breakages are produced during the reeling and weaving of the yarn, or else that a considerable deposit (fluff) or dust formation is produced, or else that the yarn obtained exhibits a high pilosity.

In contrast, the examples according to the invention show that it is possible to obtain yarns exhibiting, at the same time, good processability and a heat behavior which is very markedly superior (by a factor of 1.4 to 4 times) to that of the reference yarns.

In the examples in Table 1 the heat behavior of the yarns has been evaluated using tensile strength measurements. To do this, test pieces prepared according to ISO standard 3341 were subjected to temperatures of 600°, 800° and 1,000° C. for a period of one hour. After returning to ambient temperature, the tensile strength was measured according to ISO standard 3341. The tensile strength is given in MPa in order to allow for the linear mass and the density of the material.

Thus:

TS(MPa)=1000×density×TS (newtons)/count(tex), where tex=mass in grams per 1000 metres of yarn. The density is 2.2.

An evaluation was also carried out of the heat behavior of a fabric produced from a yarn coated with the composition of Example 4 and treated with aqueous ammonia. This yarn was woven into a satin fabric of 8.284 g/m$^2$, 22.04 warp yarns, 20.47 weft yarns, and then its chromium hydroxide coating was converted into chromium oxide by baking at 800° C. for 30 seconds.

The preparation of the test pieces from this fabric and the determination of the breaking stress were performed in accordance with NF standard B38203. The measurements were performed after return to ambient temperature on test pieces of fabric subjected to temperatures varying from 20 to 1200° C. for one hour. The results are expressed in % in comparison to the initial value measured after heat treatment for one hour at 400° C. and return to ambient temperature. The reference temperature was taken as 400° C., the organic binding agents giving yarn cohesion up to 400° C.

The results obtained are summarized in Table 2 below:

| Residual % tensile strength - reference 400° C. | Fabric according to the invention | Standard fabric* |
| --- | --- | --- |
| 400° C. | 100% | 100% |
| 600° C. | 97% | 37.7% |
| 800° C. | 58.9% | 26.7% |

-continued

| Residual % tensile strength - reference 400° C. | Fabric according to the invention | Standard fabric* |
| --- | --- | --- |
| 1000° C. | 42.6% | 24.17% |
| 1100° C. | 30.2% | 16.4% |
| 1200° C. | 24.5% | 15% |

*Conventional sized fabric (without metal salt) of the same weave and texture as the fabric according to the invention.

It can be seen that the fabric of the invention retains a higher mechanical strength than the standard fabric when subjected to high temperatures.

The above mentioned fabric and the standard fabric were also subjected to measurements of flexibility according to two methods:

Measurement of flexibility by counting filament breaks:

Test pieces 10 cm in length and 2 cm in width were cut out of the fabrics in the warp direction. These test pieces were teased to obtain straight yarn. They were then subjected to a temperature of 1200° C. for 0.5 hours. Finally the test pieces were folded over a bar of 1 mm diameter. The filaments broken at the fold were counted.

The standard fabric exhibits a very large number of broken filaments in this test, which is not the case with the fabric according to the invention.

Measurement of flexibility of the test pieces of fabrics by angle measurement:

The procedure is as for the break test to prepare the various test pieces and they are then subjected to a temperature of 1200° C. for two hours.

After the sample has returned to ambient temperature, samples 10 cm in length are adhesively bonded to a rigid support at one of their ends over a length of 2 cm.

Finally, with the support horizontal, the angle which these samples form under the effect of their own weight, in relation to the vertical, is measured.

In such a test the test pieces of the fabric according to the invention form an angle of the order of 15°, whereas the comparative test pieces form an angle of 75°.

Finally, a fabric obtained according to the invention was subjected to a flame penetration test.

This is a standardized test according to the Federal Aviation Administration, given reference Advising circular No. 20-135.

A fire-barrier panel is manufactured in the form of a sandwich including:

in its upper part: a silica fabric (Satin 8; 284 g/m$^2$; 22.04 warp yarns; 20.47 weft yarns) coated with the composition according to the invention and heat-treated;

in its middle part: an insulating fibrous material resistant to more than 1200° C. of quartz wool type;

in its lower part: a silica fabric of standard type.

The whole is bagged in a high-temperature plastic bag which has an aluminized coating on the face corresponding to the upper part of the fire-barrier panel.

This panel, larger than 250 mm×250 mm in size, is subjected to the flame of a diesel burner. The temperature is measured at a distance of 6.35 mm from the cold face of the fire-barrier panel (face not in contact with the burner flame) and controlled at 1093° C. ±65° C.

The test period is 15 min.

After inspection of the sample the fire-barrier panel has retained its integrity and sufficient flexibility characteristics corresponding to the requirements of said test.

A fire-barrier panel produced in its upper part from a silica fabric without coating according to the invention does not meet the requirements of said test in terms of flexibility.

TABLE 1

| Coating | Reference O | Ref. O - % | Ex 1 - natural | Ex 1 - % | Ex 2 - natural | Ex 2 - % | Ex 3 - natural | Ex 3 - % |
|---|---|---|---|---|---|---|---|---|
| METAL SALT | — | 0 | $CrCl_3$ | 5 | $CrCl_3$ | 10 | $CrCl_3$ | 15 |
| BINDING AGENT | Amaizo 5 | 10 | Amaizo 2213 | 2.5 | Amaizo 71 | 2.5 | Diofan A 564 S | 2.5 |
| SILANE | A187 | 0.5 | A1100 | 1.5 | A1100 | 2 | A1100 | 0.1 |
| LUBRICANT: | | | | | | | | |
| oil 1 | NS 703 | 2 | NM1350 | 2 | Fiber Lubricant 9649 | 0.2 | NS 704 | 2 |
| oil 2 | — | 0 | — | 0 | Ammonyx LO | 0.2 | NM1350 | 1.5 |
| ADDITIVES: | | | | | | | | |
| Wax | Amiwax | 0.5 | Novepox TAN 117 | 0.3 | Novepox TAN 117 | 0.3 | Novepox TAN 117 | 0.5 |
| Plasticizer | Glycerin | 0.5 | Glycerin | 0.3 | — | 0 | Glycerin | 0.5 |
| PROCESSABILITY | good | | good | x | difficult | x | difficult | x |
| HEAT Behavior | reference | | identical to reference | x | superior to reference | x | superior to reference | x |
| TS-600° C. | 124 | | 147 | x | 283 | x | 382 | x |
| TS-800° C. | 83 | | 54 | x | 315 | x | 338 | x |
| TS-1000° C. | 73 | | 63 | x | 229 | x | 278 | x |
| Sizing ratio | | 2% | | 1.42% | | 1.2% | | 1.32% |

| Coating | Ex 4 - natural | Ex 4 - % | Ex 5 - natural | Ex 5 - % | Ex 6 - natural | Ex 6 - % | Ex 7 - natural | Ex 7 - % |
|---|---|---|---|---|---|---|---|---|
| METAL SALT | $CrCl_3$ | 15 | $CrCl_3$ | 10 | $CrCl_3$ | 25 | $CrCl_3$ | 10 |
| BINDING AGENT | Acronal 250 D | 3 | Amide 14 | 4 | Acronal 250 D | 3 | Amaizo 2213 | 18 |
| SILANE | A1100 | 1 | A1100 | 1.5 | A1100 | 1 | A1100 | 2 |
| LUBRICANT: | | | | | | | | |
| oil 1 | NS 703 | 2 | Fiber Lubricant 1498 | 10 | Ammonyx LO | 2 | NM 1350 | 2 |
| oil 2 | NS 704 | 3 | Amisil | 8 | NS 704 | 3 | Fiber Lubricant 9649 | 3 |
| ADDITIVES: | | | | | | | | |
| Wax | — | | Amiwax | 0.1 | Novepox TAN 117 | 0.5 | Amiwax | 0.5 |
| Plasticizer | — | | Glycerin | 0.5 | Glycerin | 0.5 | Glycerin | 0.5 |
| PROCESSABILITY | good | x | difficult | x | difficult | x | difficult | x |
| HEAT Behavior | superior to reference | x | superior to reference | x | superior to reference | x | superior to reference | x |
| TS-600° C. | 378 | x | 306 | x | 275 | x | 374 | x |
| TS-800° C. | 346 | x | 235 | x | 210 | x | 310 | x |
| TS-1000° C. | 282 | x | 193 | x | 180 | x | 284 | x |
| Sizing ratio | | 1.38% | | 1.36% | | 3.4% | | 3.9% |

| Coating | Ex 8 - natural | Ex 8 - % | Ex 9 - natural | Ex 9 - % | Ex 10 - natural | Ex 10 - % | Ex 11 - natural | Ex 11 - % |
|---|---|---|---|---|---|---|---|---|
| METAL SALT | Cr Nitrate | 10 | Zr acetate | 10 | Cr sulfate | 10 | Ti oxysulfate | 10 |
| BINDING AGENT | Acronal 250 D | 2 | Amide 14 | 3.5 | Acronal 250 D | 3 | Amide 14 | 3.5 |
| SILANE | A1100 | 1 | A186 | 1.1 | A187 | 1 | A1100 | 1.1 |
| LUBRICANT: | | | | | | | | |
| oil 1 | NM 1350 | 6 | NS 703 | 2.2 | NS 704 | 2 | Ammonyx LO | 2.2 |
| oil 2 | — | 0 | — | 0 | Amisil | 3 | — | 0 |
| ADDITIVES: | | | | | | | | |
| Wax | Amiwax | 0.2 | Amiwax | 0.1 | Novepox TAN 117 | 0.5 | Amiwax | 0.1 |
| Plasticizer | Glycerin | 0.5 | — | 0 | Glycerin | 0.5 | — | 0 |
| PROCESSABILITY | good | x | good | x | good | x | good | x |
| HEAT BEHAVIOR | superior to reference | x | superior to reference | x | superior to reference | x | superior to reference | x |
| TS-600° C. | 240 | x | 263 | x | 375 | x | 267 | x |
| TS-800° C. | 210 | x | 263 | x | 310 | x | 253 | x |
| TS-1000° C. | 120 | x | 215 | x | 265 | x | 205 | x |
| Sizing ratio | | 1.63% | | 1.72% | | 1.45% | | 1.92% |

TABLE 1-continued

| Coating | Ex 12 - natural | Ex 12 - % | Ex 13 - natural E glass - ref | Ex 13 - % | Ex 14 - natural Treated E glass | Ex 14 - % | Ex 15 - natural Silica sol-gel reference | Ex 15 - % |
|---|---|---|---|---|---|---|---|---|
| METAL SALT | AlCl$_3$ | 10 | — | 0 | CrCl$_3$ | 15 | — | 0 |
| BINDING AGENT | Acronal 250 D | 3 | Amaizo 5 | 10 | Acronal 250 D | 3 | Amaizo 5 | 10 |
| SILANE | A1100 | 1 | A187 | 0.5 | A1100 | 1 | A187 | 0.5 |
| LUBRICANT: | | | | | | | | |
| oil 1 | NM 1350 | 2 | NS 703 | 2 | NS 703 | 2 | NS 703 | 2 |
| oil 2 | Amisil | 3 | — | 0 | NS 704 | 3 | — | 0 |
| ADDITIVES: | | | | | | | | |
| Wax | Cation X | 0.5 | Amiwax | 0.5 | Novepox TAN 117 | 0.5 | Amiwax | 0.5 |
| Plasticizer | Glycerin | 0.5 | Glycerin | 0.5 | Glycerin | 0.5 | Glycerin | 0.5 |
| PROCESSABILITY | good | x | good | x | good | x | good | x |
| HEAT BEHAVIOR | superior to reference | x | reference E glass | x | superior to reference | x | reference silica sol-gel | x |
| TS-600° C. | 370 | x | 400° C. = 270 | x | 400° C. = 380 | x | 120 | x |
| TS-800° C. | 300 | x | 600° C. = 126 | x | 600° C. = 200 | x | 70 | x |
| TS-1000° C. | 255 | x | 700° C. = 58 | x | 700° C. = 120 | x | 50 | x |
| Sizing ratio | | 1.11% | | 2.43% | | 1.77% | | 2.74% |

| Coating | Ex 16 - natural Silica sol-gel, treated | Ex 16 - % | Ex 17 - natural Ceramic yarn: reference | Ex 17 - % | Ex 18 - natural Ceramic yarn, treated | Ex 18 - % |
|---|---|---|---|---|---|---|
| METAL SALT | CrCl$_3$ | 15 | — | 0 | CrCl$_3$ | 15 |
| BINDING AGENT | Acronal 250 D | 3 | Amaizo 5 | 10 | Acronal 250 D | 3 |
| SILANE | A1100 | 1 | A187 | 0.5 | A1100 | 1 |
| LUBRICANT: | | | | | | |
| oil 1 | NS 703 | 2 | NS 703 | 2 | NS 703 | 2 |
| oil 2 | NS 704 | 3 | — | 0 | NS 704 | 3 |
| ADDITIVES: | | | | | | |
| Wax | Novepox TAN 117 | 0.5 | Amiwax | 0.5 | Novepox TAN 117 | 0.5 |
| Plasticizer | Glycerin | 0.5 | Glycerin | 0.5 | Glycerin | 0.5 |
| PROCESSABILITY | good | x | good | x | good | x |
| HEAT BEHAVIOR | superior to reference sol-gel | x | reference ceramic yarn | x | superior to reference Ex 17 | x |
| TS-600° C. | 260 | x | 350 | x | 498 | x |
| TS-800° C. | 250 | x | 340 | x | 518 | x |
| TS-1000° C. | 240 | x | 320 | x | 524 | x |
| Sizing ratio | | 1.74% | | 1.59% | | 1.67% |

Notes
Amaizo 5: starch of pH 5 in solution at a concentration of 33% by weight.
Amaizo 71: starch of pH 5 to 6, highly film-forming, in solution at a concentration of 33% by weight.
Amaizo 2213: high viscosity starch of pH 5 to 6, in solution at a concentration of 33% by weight.
Diofan A 564 S: vinylidene chloride of pH 1.5 to 2.5.
Acronal 250 D: acrylate of pH 2 to 3.5 of Tg 24° C.
Amide 14: reactive polyamide resin with a viscosity of 11.6 Pa s at 250° C.
NS 703: soap with a viscosity of 12.6 mm$^2$/s at 40° C. of pH = 6.3.
NS 704: vaseline oil with a viscosity of 18.8 mm$^2$/s at 40° C. of pH = 7.55.
Ammonyx LO: alkyldimethylamine.
NM 1350: dimethylpolysiloxane with a viscosity of 350 mPa s at 25° C.
Amisil: silicone emulsion.
Fiber Lubricant 1498: polyalkylene glycol with a viscosity of 33 mm$^2$/s at 21° C.
Fiber Lubricant 9649: polyalkylene glycol with a viscosity of 54 mm$^2$/s at 21° C.
A1100: gamma-aminopropyltriethoxysilane.
A187: gamma-glycidoxypropyltrimethoxysilane.
A186: beta-(3,4-epoxycyclohexyl)ethyltrimethoxysilane.
AMEO: aminopropyltriethoxysilane.
Z6032: silane of vinylbenzylamine functionality.
Novepox TAN 117: epoxidized polyoxyalkylene wax with a melting point of 40 to 50° C.
Amiwax: polyoxyethylene glycol wax with a molecular weight of approximately 300.

I claim:

1. Continuous inorganic yarn coated with a sizing composition which can be converted into a ceramic material and which includes, in %, by weight:

a) 5.5 to 20% of at least one water-soluble metal salt selected from the group consisting of chromium, zirconium, titanium and aluminum salts;
b) 0.2 to 15% of at least one binding agent;

c) 0.15 to 3% of at least one silane containing amine, alkoxy, epoxy, sulfide, methacroyl, vinyl, ureido or isocyanate groups and imparting resistance to abrasion and tensile strength of dry yarn to said continuous inorganic yarn;

d) 0.6 to 17% of at least one lubricating agent; and e) a balance of water.

2. The yarn as claimed in claim 1, wherein said composition additionally contains up to 2% by weight of at least one conventional additive.

3. The yarn as claimed in claim 2, wherein said composition includes, in % by weight:

10–18% of ingredient (a),

1–6% of ingredient (b), 0.4–1.8% of ingredient (c), 1.5–10% of ingredient (d), this ingredient (d) being selected from the group consisting of 0.3 to 4%, based on the total weight of said composition, of soluble oil, and 0.4 to 6% based on the total weight of said composition, of emulsified oil, 0.1–1% of wax, 0.1–1% of plasticizer, and a balance of water.

4. The yarn as claimed in claim 3, wherein said composition includes, in % by weight, approximately:

15% of ingredient (a),

3% of ingredient (b),

1% of ingredient (c),

2% of soluble oil,

3% of emulsified oil, 0.5% of wax, and 0.5% of plasticizer, and balance of water.

* * * * *